Patented Nov. 26, 1946

2,411,806

UNITED STATES PATENT OFFICE 2,411,806

PURIFICATION OF ALUMINA

August H. Riesmeyer, Collinsville, and Walter H. Gitzen, Belleville, Ill., assignors to Aluminum Company of America, Pittsburgh, Pa., a corporation of Pennsylvania No Drawing. Application February 22, 1945, Serial No. 579,320

8 Claims. (Cl. 23—143)

This invention relates to the removal of impurities from aluminous material, and relates particularly to the removal of alkali metal compounds from alumina.

Alumina frequently contains a small amount of a sodium compound or compounds, usually referred to and expressed as soda ($Na_2O$), as a result of the materials used in the production of the alumina. For example, alumina is principally produced in this country by precipitating aluminum hydrate from a sodium aluminate solution by auto-precipitation, and then calcining the aluminum hydrate. The precipitated aluminum hydrate contains a small amount of soda from the sodium aluminate solution, and although much of the soda can be removed by washing the hydrate, or the alumina produced therefrom, with water, even repeated and lengthy washing fails to remove all of the soda present. Consequently, the alumina usually contains about 0.5 to 0.7 per cent by weight of soda. Aluminum hydrate can also be precipitated from sodium aluminate solutions by other well known methods which result in the presence of soda in the precipitate and in alumina produced therefrom.

The presence of the soda is objectionable in a number of uses for alumina, such as the manufacture of certain refractory or ceramic articles, and various processes in which alumina is used as a catalyst or as an auxiliary catalyst or catalyst support. Various methods for removing soda from alumina have been proposed, including treatments involving washing alumina or aluminum hydrate with acid, but such methods have been subject to the objections that they are only partially effective or are expensive.

It is an object of this invention to provide a method for removing soda from alumina, and it is a particular object of this invention to provide an economical and effective method involving treatment with acid for removing soda from alumina. It is a further object of this invention to provide a method of treating alumina containing soda with acids which makes it possible to remove soda from alumina to any desired extent, including substantially complete removal of soda.

In accordance with this invention, alumina containing soda is leached with two separate solutions of acids, one of which is a hydrofluoric acid solution. As the acid other than hydrofluoric acid, it is advantageous to use hydrochloric, sulfuric, nitric, boric, oxalic, or acetic acids, and particularly good results are obtained with hydrochloric acid and sulfuric acid.

In carrying out the invention, the order in which the acid leaching solutions are used is material, for markedly better results are obtained if the alumina is leached with the hydrofluoric acid solution first and then with the additional acid solution, than if the solutions are used in the reverse order, other conditions being the same.

The acids mentioned above as desirable to use as the acid other than hydrofluoric acid dissolve double salts of sodium and aluminum, such as sodium cryolite or chiolite. It may be that in leaching the alumina with hydrofluoric acid, the hydrofluoric acid reacts with soda and alumina values to form such a double salt, and that the second acid dissolves that salt.

The amount, concentration, and temperature of the leaching solutions, and the duration of the leaching operations are interrelated, and the conditions desirable for optimum results with respect to any one of those factors depend to some extent on the particular conditions existing with respect to the other factors mentioned. For example, in general, the time of leaching required is shortened if stronger leaching solutions are used, and an increase in temperature of the leaching solutions shortens the time required for equivalent removal of soda, other conditions remaining the same.

The leaching solutions may be allowed merely to stand in contact with the alumina, with or without agitation, or they may be circulated through the alumina. As to the concentration of acid in the leaching solutions, it is ordinarily satisfactory to employ solutions containing from 2.5 to 20 per cent of acid by weight, though in the case of the solutions containing an acid other than hydrofluoric acid, somewhat stronger solutions may be required in the case of the weaker acids to obtain results equivalent to those obtained with 2.5 to 20 per cent solutions of strong acids.

It is desirable that the leaching solutions be used hot, a temperature of at least 150° F. being preferable. The duration of the leaching operations may vary, depending on the particular conditions of operation and the extent to which it is desired to eliminate soda from the alumina, but a period of from ½ hour to 3 hours for each leaching operation is generally satisfactory. If the soda content is not lowered to the desired extent by a single cycle of treatment with the two acid solutions, it can be further lowered by additional leaching with acid solutions in accordance with the above described conditions.

After each leaching operation, the acid solution is separated from the alumina by filtering or the like, and the solution can be re-used in treating additional alumina, the sodium values being removed from the solution by well known methods when they have accumulated to such an extent as to impair the efficiency of the solution unduly. After separation of each acid solution from the alumina, the alumina is preferably washed with water to remove residual acid and soluble impurities left therein by the leaching operation.

This invention is applicable to both anhydrous alumina and alumina having free or chemically combined water associated with it. Consequently, the term "alumina" is used herein to refer to anhydrous alumina and hydrated or hydrous forms of alumina, such as aluminum trihydrate and gelatinous alumina. However, preferably the alumina is anhydrous or of low total water content.

The following example illustrates the operation of the invention.

Alumina produced by calcining aluminum trihydrate obtained from a sodium aluminate solution by the well known Bayer auto-precipitation process, and containing 0.68 per cent by weight of soda, was leached with an equal weight of 6N hydrofluoric acid solution and allowed to stand for 45 minutes, the slurry being kept at 180° F. After filtering off the acid and washing the alumina with water and then drying it, the alumina was mixed with an equal weight of 6N hydrochloric acid solution and allowed to stand for 45 minutes, the slurry again being maintained at 180° F. When the hydrochloric acid solution was filtered off and the alumina was washed thoroughly with water and dried, the alumina was found to contain 0.005 per cent by weight of soda.

For comparison, similar alumina was subjected to two leaches under the same conditions as described in the preceding paragraph, except that a 6N hydrochloric acid solution was used for both of the acid leaching steps. Upon completion of the treatment, the alumina contained 0.3 per cent by weight of soda.

This application is a continuation-in-part of application Serial No. 522,836, filed February 17, 1944.

We claim:

1. The method of removing soda from alumina, comprising leaching the alumina with a hydrofluoric acid solution, and subsequently leaching the said alumina with a solution of another acid, said leaching operations being continued for a time insufficient for the said solutions to react with all of the alumina.

2. The method of removing soda from alumina, comprising leaching the alumina with a hydrofluoric acid solution, and subsequently leaching the said alumina with a solution of another acid, said second-mentioned solution being capable of dissolving double fluoride salts of sodium and aluminum, and said leaching operations being continued for a time insufficient for the said solutions to react with all of the alumina.

3. The method of removing soda from alumina, comprising successively leaching the alumina with a solution containing at least 2.5 per cent by weight of hydrofluoric acid and subsequently leaching the said alumina with a solution containing at least 2.5 per cent by weight of another acid, said leaching operations being continued for a time insufficient for the said solutions to react with all of the alumina.

4. The method of removing soda from alumina, comprising leaching the alumina with a hydrofluoric acid solution, and subsequently leaching the said alumina with a solution of another acid, said solutions being at a temperature of at least 150° F., and said leaching operations being continued for a time insufficient for the said solutions to react with all of the alumina.

5. The method of removing soda from alumina, comprising leaching the alumina with a hydrofluoric acid solution, thereafter washing said alumina with water, subsequently leaching said alumina with a solution of another acid, and thereafter washing said alumina with water, said leaching operations being continued for a time insufficient for the said solutions to react with all of the alumina.

6. The method of removing soda from alumina obtained from a solution containing a dissolved sodium compound, comprising leaching the alumina with a hydrofluoric acid solution, and subsequently leaching the said alumina with a solution of another acid, said leaching operations being continued for a time insufficient for the said solutions to react with all of the alumina.

7. The method of removing soda from alumina obtained from a solution containing a dissolved sodium compound, comprising leaching the alumina with a hydrofluoric acid solution, and subsequently leaching the said alumina with a solution of another acid, said second-mentioned solution being capable of dissolving double fluoride salts of sodium and aluminum, and said leaching operations being continued for a time insufficient for the said solutions to react with all of the alumina.

8. The method of removing soda from alumina obtained from a solution containing a dissolved sodium compound, comprising leaching the alumina with a hydrofluoric acid solution, thereafter washing said alumina with water, subsequently leaching said alumina with a solution of another acid, and thereafter washing said alumina with water, said leaching operations being continued for a time insufficient for the said solutions to react with all of the alumina.

AUGUST H. RIESMEYER.
WALTER H. GITZEN.